(No Model.)

E. S. LOCKSTONE.
ROASTING PAN.

No. 604,252.  Patented May 17, 1898.

Witnesses
Robert Emmett
J. B. Keeder

Inventor
Edward S. Lockstone
By James L. Norris
Atty

UNITED STATES PATENT OFFICE.

EDWARD SIDNEY LOCKSTONE, OF BLANCHESTER, OHIO.

ROASTING-PAN.

SPECIFICATION forming part of Letters Patent No. 604,252, dated May 17, 1898.

Application filed November 26, 1897. Serial No. 659,890. (No model.)

*To all whom it may concern:*

Be it known that I, EDWARD SIDNEY LOCKSTONE, a citizen of the United States, residing at Blanchester, in the county of Clinton and State of Ohio, have invented new and useful Improvements in Roasting-Pans, of which the following is a specification.

This invention relates to roasting-pans that are arranged to avoid all risk of burning or scorching the meat or poultry to be roasted and to facilitate the basting of the same and the collection and straining of the drippings and gravy free from any portions of meat that may drop during the cooking operation.

My improvements consist in the features of construction and novel combinations of parts in a roasting apparatus for meat or poultry, as hereinafter described and claimed.

Figure 1:
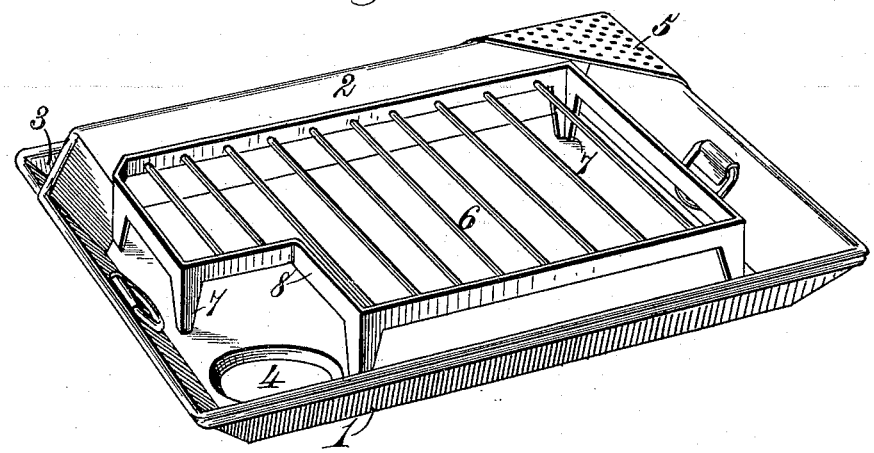
Figure 2:
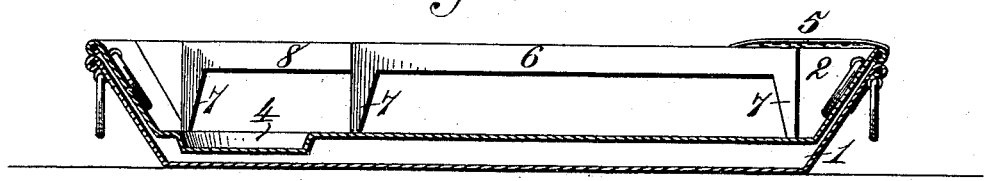
Figure 3:
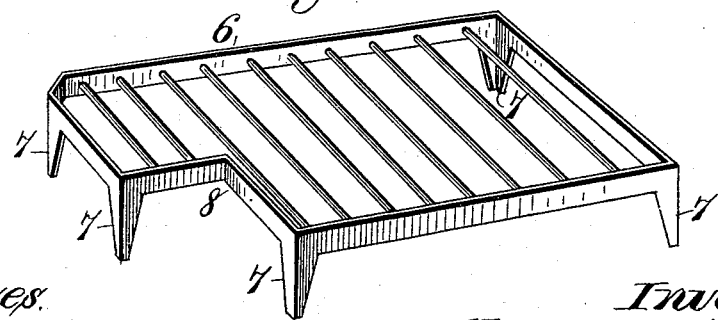

In the annexed drawings, illustrating the invention, Figure 1 is a perspective of my improved roasting-pan, showing the several parts assembled. Fig. 2 is a vertical longitudinal section of the same. Fig. 3 is a view of the rack or grid removed.

The outer or lower pan 1 is of ordinary construction, preferably made with sloping sides, and of suitable depth. This lower pan is to contain water for supplying steam or moisture to the contents of an inner or upper pan 2, which has about the same form as the lower pan, but is of less depth, so as to afford space for water between the two pans.

It will be seen that the inner or upper pan 2 is so proportioned and constructed as to nest loosely within the outer or lower pan 1, the flanged or beaded edge of the inner pan being arranged to rest upon the edge of the outer pan when the two pans are put together.

One corner of the inner pan 2 is beveled off or drawn inward to provide a substantially triangular passage 3 between the outer and inner pans through which water can be poured into the outer pan without disturbing or removing the inner pan and which will also afford a vent for the access of steam and moisture to the article being cooked.

At a suitable point in the inner pan 2, preferably near one corner, there is formed a depression or basin 4, in which will collect the drippings or meat-juices and from which the same can be conveniently dipped and basted onto the meat or poultry. Another corner of the inner pan 2 is provided at the top with a strainer 5 for straining off the gravy and juices clear from any small fragments of meat that may have fallen into the pan while the meat was roasting.

For the purpose of supporting the meat or other article of food in the pan 2 there is provided a rack, grid, or open-work frame 6, that may be provided with feet 7, as shown. One corner of this frame or grid 6 has an aperture 8, that coincides with the pan depression or basin 4 and is of sufficient area to permit the insertion of a spoon for dipping up the basting-drip, so that it can be conveniently distributed over the meat.

The grid 6 is made strong enough to support a roast of meat and hold it up out of the drippings, so that it will cook evenly. By having water in the outer pan 1 and allowing the steam to escape through the passage 3 from the lower or outer pan to the inner one the meat or poultry will keep sufficiently moist, and no water will be needed in the inner pan, which will receive only the drippings. The use of these drippings free from water as a basting for the meat will retain the full flavor of the roasted meat unimpaired from mixing with water, which is the trouble with most pans.

After the meat is cooked and removed the grid 6 can be taken from the pan and then the clear drippings can be poured off through the pan-strainer 5, so as to be free from any meat fragments. With this pan the cooking is done partly by hot air and partly by steam, the natural juices and flavors are retained, and the meat will be roasted and browned uniformly.

What I claim as my invention is—

The combination with the lower or outer pan, of the inner or upper pan having a corner beveled off or drawn inward, and a grid arranged in the inner pan, the said inner pan being supported in the outer pan at the edges of said pans and with a water-space between the two pans, whereby the beveled-off or inwardly-drawn corner of the inner pan will afford a passage for introducing water into the outer pan and for escape of steam, substantially as described.

In testimony whereof I have hereunto set my hand in presence of two subscribing witnesses.

EDWARD SIDNEY LOCKSTONE.

Witnesses:
P. A. SNYDER,
JOHN W. MILLER.